United States Patent Office 3,600,206
Patented Aug. 17, 1971

3,600,206
MgO-P₂O₅ FUSED CAST REFRACTORY
Allen M. Alper and Robert N. McNally, Corning, N.Y., assignors to Corhart Refractories Company, Louisville, Ky.
No Drawing. Filed Feb. 27, 1969, Ser. No. 803,053
Int. Cl. C04b 35/04
U.S. Cl. 106—58                      7 Claims

ABSTRACT OF THE DISCLOSURE

Thermal shock resistant, fused cast refractory composed of, by weight on an oxide basis, 4 to 20% $P_2O_5$, 0 to 25% CaO, BaO, SrO and mixtures thereof, 0 to less than 10% $SiO_2$, $B_2O_3$, $ZrO_2$, $Cr_2O_3$ and mixtures thereof, 0 to 5% halogen and the balance being at least 69% MgO and less than 1% incidental impurities. Microstructure essentially being a major phase of periclase crystals in a labyrinthine pattern defined by a large amount of direct bonding between adjacent periclase crystals and by a minor phosphate randomly interspersed among the periclase crystals.

BACKGROUND OF THE INVENTION

This invention relates to MgO base refractory made by melting and resolidifying suitable refractory raw materials to form monolithic bodies that are characterized by excellent thermal shock resistance, high temperature strength and resistance to corrosion by chemically basic environments. Such refractory is particularly suitable for those portions of basic steelmaking furnace linings that are subjected to substantial thermal shock, such as in electric furnace roofs and in the upper lining rings of the basic oxygen vessels.

United States Pat. 2,234,006 disloses a fused cast basic refractory containing $P_2O_5$ that is reported to be characterized by substantial resistance to thermal shock spalling as well as by high resistance to attack by basic slags and atmospheres. That refractory is composed essentially of, by weight on an oxide basis, 50–80% MgO and/or CaO, 3–15% oxide of aluminum and/or iron, and 3–15% $P_2O_5$. We have found that such refractory does not have adequate thermal shock resistance to meet the more severe requirements for practical linings in modern furnaces.

SUMMARY OF THE INVENTION

We have discovered that a MgO base fused cast refractory containing $P_2O_5$ can be made with greatly improved thermal shock resistance when oxides of iron and/or aluminum are excluded or, at most, kept to very low levels of incidental impurities derived from relatively high purity grades of raw materials. Such refractory is also highly resistant to corrosive basic slags and atmospheres, and it has very good hot strength, e.g. averaging between about 3500 p.s.i. and 5000 p.s.i. at 1340° C.

In general, the fused cast refractory according to this invention is composed of, by weight on an oxide basis, 4 to 20% (more desirably 5–10%) $P_2O_5$, 0 to 25% CaO, BaO, SrO and mixtures thereof, 0 to less than 10% $SiO_2$, $B_2O_3$, $ZrO_2$ $Cr_2O_3$ and mixtures thereof, 0 to 5% halogen (such as fluorine and/or chlorine), and the balance being at least 69% (more desirably 75–95%) MgO and less than 1% incidental impurities. For assuring the highest degree of basic slag corrosion resistance, it is desirable to keep the total of CaO, BaO and SrO at 20% or less, and/or the total of $SiO_2$, $B_2O_3$, $ZrO_2$ and $Cr_2O_3$ less than 5%, and/or the total of halogen less than 2%. Generally, it is preferred to omit the latter four oxides and CaO is employed in preference to either BaO or SrO, unless all three are omitted.

The new refractory is produced by the customary fusion casting procedure of premixing suitable raw materials, melting that mixture in an electric furnace with carbon or graphite electrodes and pouring the molten material into preformed molds of suitable material, e.g. graphite or iron. Melting should be done with no substantial contact or submergence of the electrodes with or in the molten pool so as to avoid any significant reduction of the $P_2O_5$ content that leads to the formation of detrimental phosphorus-containing phase or phases in the refractory accompanied by the evolution of toxic gases. A very short arc between each electrode and the molten pool (i.e. with the electrode tip almost touching the pool) gives satisfactory product results with the reasonably good power efficiency and minimal toxic gas evolution. If desired, the mold can also be the furnace container in which the melting is done, in which case the pouring step is omitted and the molten contents are allowed to solidify in that container. The mold may be of a size to form a single brick or block product, or it may be larger to form a billet from which several brick or block products can be cut. If graphite slabs are used to construct the mold (as is common for basic fused cast refractory), they should be relatively thick enough for any particular size of casting to provide adequate heat dissipation from the molten material cast and solidified thereagainst so as to avoid the detrimental chemically reduced condition in such solidified material, which may result when the graphite slabs (backed up by annealing powder) are too thin. Appropriate thickness of graphite mold slabs can be readily selected on the basis of the following criteria found to give suitable results:

| Graphite mold slab thickness: | Cast brick transverse cross-section, inches |
| --- | --- |
| Greaters than ¼″ | 3 x 4½ |
| Greater than ¾″ | 6 x 18 |

Suitable exemplary raw materials are calcined sea-water magnesia (or other relatively high purity forms of magnesia) and orthophosphates of calcium and/or magnesium. Optionally, the orthophosphates may be replaced, in whole or in part, by fluor- and/or chlor-apatites, which may additionally provide a halogen (i.e. fluorine and/or chlorine) content in the refractory that may assure an even less frequent occurrence of a casting rejected for crack or spall defects than would otherwise be the case in the ordinary manufacturing operation. Other permitted optional oxides can be added in their commercially pure forms.

The resulting fusion cast product according to this invention possesses a unique microstructure that is believed to be largely responsible for the substantially improved thermal shock resistance. This microstructure is essentially a major phase of periclase crystals in a labyrinthine pattern defined by a large amount of direct bonding between adjacent periclase crystals and by a minor phosphate phase randomly dispersed among the periclase crystals. Such structure apparently makes it quite difficult for cracks to propagate through the fused cast body.

DESCRIPTION OF THE PREFERRED EMBODIMENTS

The table below sets forth three illustrative compositions of fused cast refractory made according to the present invention (Melts 1, 2 and 3) and one illustrative composition made according to U.S. Patent 2,234,006 (Melt 4). All the compositional data is on a weight basis. Typical analyses of the batch raw materials are as follows:

Calcined magnesia: 98.51% MgO. 0.28% $SiO_2$, 0.22% $Fe_2O_3$, 0.86% CaO and 0.13% loss on ignition, Tricalcium phosphate (also known as calcium orthophosphate): 52.7% CaO, 41.0% $P_2O_5$ and 6.1% loss on ignition, Silica sand: 99.92% $SiO_2$ and 0.04% $Al_2O_3$,
Iron oxide: 99.5% minimum $Fe_2O_3$, approximately 0.1% impurities and 0.4% maximum loss on ignition.

TABLE

| Melt | 1 | 2 | 3 | 4 |
|---|---|---|---|---|
| Batch mixture: | | | | |
| Calcined magnesia | 70 | 70 | 86.5 | 82 |
| Tricalcium phosphate | 30 | 25 | 13.5 | 13 |
| Silica sand | | 5 | | |
| Iron oxide | | | | 5 |
| Analysis (calculated): | | | | |
| MgO | 69.05 | 69.05 | 85.32 | 80.97 |
| $P_2O_5$ | 13.14 | 10.95 | 5.91 | 5.54 |
| CaO | 17.46 | 14.65 | 8.34 | 8.08 |
| $SiO_2$ | 0.20 | 5.19 | 0.24 | 0.23 |
| FeO | | | | 5.17 |
| Incidental impurities | 0.15 | 0.16 | 0.19 | 0.01 |

For demonstrating the excellent improvement in thermal shock resistance of refractory according to the present invention in contrast with the prior known refractory, a standardized severe test was employed. In this test, 1″ x 1″ x 3″ samples at room temperature are put into a furnace preheated to 1400° C., held in the furnace for 10 minutes to allow the samples to become uniformly heated, then pulled out into the air and held there for 10 minutes so that the samples become substantially cooled to room temperature. This procedure constitutes one cycle of the test. If a sample has spalled or cracked into two or more pieces, the test is concluded. Otherwise, the cycle is repeated until such spalling or cracking occurs. The total number of cycles completed at the point of this spalling or cracking are noted.

Samples of the refractory of the present invention, when subjected to the above described test, can withstand at least about 5 or more cycles before spalling or cracking occurs. For example, of two samples of Melt 1 cycled to fracture, one sample lasted 30 cycles while the other sample lasted 13 cycles. In contrast, seven samples of Melt 4 were spalled at the end of the first test cycle.

While all of the refractories with the above noted compositions possess at least moderately good resistance to basic slag corrosion, refractories whose compositions include at least about 85% MgO (e.g. Melt 3) have a very high resistance to corrosive attack by basic slags.

The good hot strength of the refractory according to the present invention is evident from the average values for modulus of rupture in flexure at 1340° C. of samples of Melts 1 and 3, which were 3680 p.s.i. and 4830 p.s.i., respectively.

Trimagnesium phosphate (also known as magnesium orthophosphate) or an apatite can be substituted, in whole or in part, for tricalcium phosphate in the above noted examples of this invention when it is desired to make the refractory of the present invention with minimized CaO content while still having the improved resistance to thermal shock. Also, corresponding amounts of relatively pure boric oxide, zirconia and/or chromic oxide can be substituted, in whole or in part, for the silica sand without any significantly detrimental effect on the improved thermal shock resistance and other properties of the refractory according to the present invention. Moreover, the latter substitution may be beneficial to the basic slag corrosion resistance of the refractory.

We claim:
1. A fused cast refractory composed of, by weight on an oxide basis, 4 to 20% $P_2O_5$, 0 to 25% CaO, BaO, SrO and mixtures thereof, 0 to less than 10% $SiO_2$, $B_2O_3$, $ZrO_2$, $Cr_2O_3$ and mixtures thereof, 0 to 5% halogen, and the balance being MgO in an amount of at least 69% plus incidental impurities in an amount less than 1%.

2. The fused cast refractory of claim 1 wherein the CaO, BaO, SrO and mixtures thereof does not exceed 20%, the $SiO_2$, $B_2O_3$, $ZrO_2$, $Cr_2O_3$ and mixtures thereof is less than 5%, and the halogen is less than 2%.

3. The fused cast refractory of claim 1 composed of, by weight on an oxide basis, 5 to 20% $P_2O_5$, 0 to 20% CaO, 0 to less than 5% $SiO_2$, and the blance being at least 69% MgO and less than 1% incidental impurities.

4. The fused cast refractory of claim 1 wherein MgO is 75 to 95%.

5. The fused cast refractory of claim 4 wherein the $P_2O_5$ is 5 to 10%.

6. The fused cast refractory of claim 1 wherein the halogen is fluorine, chlorine and mixtures thereof.

7. The fused cast refractory of claim 1 wherein the microstructure consists essentially of a major phase of periclase crystals in a labyrinthine pattern defined by a large amount of direct bonding between adjacent periclase crystals and by a minor phosphate phase randomly dispersed among the periclase crystals.

References Cited
UNITED STATES PATENTS 2,234,006  3/1941  McMullen _____ 106—62
3,293,053  12/1966  Alper et al. _____ 106—58

JAMES E. POER, Primary Examiner

U.S. Cl. X.R.

106—63